(12) United States Patent
Yang et al.

(10) Patent No.: US 9,311,589 B2
(45) Date of Patent: Apr. 12, 2016

(54) BOTTLE CONTAINER HAVING AN ANTI-COUNTERFEITING RADIO-FREQUENCY IDENTIFICATION (RFID) TAG

(71) Applicant: NATIONAL CHUNG SHAN INSTITUTE OF SCIENCE AND TECHNOLOGY, Longtan Township (TW)

(72) Inventors: Po-Chun Yang, Longtan Township (TW); Ming-Town Lee, Longtan Township (TW); Yu-Cheng Chang, Longtan Township (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 14/305,136

(22) Filed: Jun. 16, 2014

(65) Prior Publication Data
US 2015/0363686 A1    Dec. 17, 2015

(51) Int. Cl.
| | |
|---|---|
| *G06K 19/07* | (2006.01) |
| *B65D 55/08* | (2006.01) |
| *G06K 19/077* | (2006.01) |
| *G08B 13/24* | (2006.01) |
| *B65D 55/02* | (2006.01) |

(52) U.S. Cl.
CPC .......... *G06K 19/07773* (2013.01); *B65D 55/02* (2013.01); *B65D 55/028* (2013.01); *B65D 55/0827* (2013.01); *G06K 19/07758* (2013.01); *G06K 19/07798* (2013.01); *G08B 13/2434* (2013.01); *B65D 2203/10* (2013.01)

(58) Field of Classification Search
CPC .. B65D 55/02; B65D 55/028; B65D 55/0827; B65D 55/06; B65D 2203/10; B65D 2101/0046; B65D 2211/00; B65D 2101/0092; B65D 2101/0023; G06K 19/04; G06K 19/073; G06K 19/07749; G06K 19/07758; G06K 19/07798; G08B 13/2428; G08B 13/2434; G08B 13/06; Y10S 215/901
USPC ................. 235/492; 340/568.1, 568.2, 572.1, 340/572.7–572.9
See application file for complete search history.

(56) References Cited

U.S. PATENT DOCUMENTS

| | | | | |
|---|---|---|---|---|
| 7,034,689 | B2 * | 4/2006 | Teplitxky | ............... B65D 55/06 340/572.1 |
| 7,048,179 | B2 * | 5/2006 | Claessens | ............ G06Q 20/207 235/375 |

(Continued)

FOREIGN PATENT DOCUMENTS

| | | |
|---|---|---|
| TW | I262258 | 9/2006 |
| TW | M355918 | 5/2009 |

*Primary Examiner* — Michael G Lee
*Assistant Examiner* — Suezu Ellis
(74) *Attorney, Agent, or Firm* — Schmeiser, Olsen & Watts, LLP

(57) ABSTRACT

An anti-counterfeiting RFID tag structure includes a body and a RFID device disposed on the body. The body is an O-ring. The RFID device includes a RFID chip circuit and an antenna structure. The anti-counterfeiting RFID tag structure is disposed fully between the cap and the opening of the bottle container whenever the bottle container is sealed. A user reads anti-counterfeiting ID code and product curriculum vitae data stored in the RFID device, using a stationary or handheld RFID reader, so as to effectuate identification and anti-counterfeiting.

3 Claims, 3 Drawing Sheets

(56) References Cited

U.S. PATENT DOCUMENTS

| | | | | |
|---|---|---|---|---|
| 7,388,506 B2* | 6/2008 | Abbott | B65D 41/045 | 340/572.1 |
| 7,969,308 B2* | 6/2011 | Cotton | B65D 55/028 | 340/539.1 |
| 8,282,013 B2* | 10/2012 | Stewart | F16J 15/064 | 235/492 |
| 2007/0051691 A1* | 3/2007 | Hidding | B65D 41/045 | 215/252 |
| 2008/0198014 A1* | 8/2008 | Vogt | G06Q 10/087 | 340/572.1 |
| 2008/0252450 A1* | 10/2008 | Wandel | B65D 55/026 | 340/541 |
| 2009/0022986 A1* | 1/2009 | Wesselmann | G09F 3/0292 | 428/345 |
| 2009/0045959 A1* | 2/2009 | Adstedt | B65D 55/028 | 340/572.3 |
| 2010/0141384 A1* | 6/2010 | Chen | B65D 41/3409 | 340/10.1 |
| 2015/0090625 A1* | 4/2015 | Bauss | B65D 23/085 | 206/459.5 |
| 2015/0186770 A1* | 7/2015 | Arai | B65D 55/02 | 235/492 |

\* cited by examiner

BOTTLE CONTAINER HAVING AN ANTI-COUNTERFEITING RADIO-FREQUENCY IDENTIFICATION (RFID) TAG

FIELD OF TECHNOLOGY

The present invention relates to anti-counterfeiting tag structures, and more particularly, to an anti-counterfeiting RFID tag structure integrated into radio frequency technology, so as to effectuate identification and anti-counterfeiting.

BACKGROUND

Recent statistics reveal that 560 billion dollars worth of copycat goods are produced worldwide each year. To stop the circulation of copycat goods on the market, the global anti-counterfeiting market expands at an annual growth rate of 30% approximately. Therefore, anti-counterfeiting technology advancement is of vital importance.

Anti-counterfeiting printing technology has wide application, including banknotes, negotiable securities, credit cards, stamps, gift certificates, alcohols, cosmetics, and commercial documents. To facilitate the circulation of goods on the markets, various labels are affixed to the goods for the sake of identification. In this regard, passive radio-frequency identification tags, or passive RFID tags for short, substitute for barcodes in part. For example, a passive RFID tag is affixed to the seal of a wine bottle cap and comprises a RFID chip which carries information pertaining to the wine contained in the wine bottle.

Conventionally, high-priced products, including alcohols, cosmetics, and drugs, are packaged in bottles and jars made mostly of glass or porcelain. Although novel anti-counterfeiting techniques keep emerging, forgery remains unabated. For instance, in attempt to eliminate adulterated pricey wine, first-line anti-counterfeiting measures taken by domestic and foreign wine brewers are directed to wine bottle cap and wine bottle labels, by augmenting the difficulty in forgery and increasing the costs incurred in forgery. The anti-counterfeiting measures include one-dimensional and two-dimensional barcode tags, laser tags, anti-counterfeiting bottle caps, and anti-counterfeiting ink printing. However, in practice, the aforesaid anti-counterfeiting measures do not add to the difficulty in forgery markedly, and thus copycat criminals readily manage to crack the aforesaid anti-counterfeiting measures. As a result, bottled product forgery just cannot be eradicated for the time being. In recent years, due to the advancement of RFID-based electronic anti-counterfeiting technology, some bottled product manufacturers are turning to RFID technology.

Referring to FIG. 1, there is shown a schematic view of a conventional bottle container. As shown in the diagram, the conventional bottle container comprises an opening 11 and a cap 12. A coupling portion 111 is disposed at the opening 11. Prior to its delivery, the conventional bottle container is closed because the cap 12 presses against the coupling portion 111. To open the cap 12, a user applies a force to the cap 12 to separate the cap 12 from the coupling portion 111. The conventional bottle container is easy to counterfeit illegally and lucratively, whether locally or abroad. Referring to FIG. 2, there is shown a schematic view of a conventional anti-counterfeiting cap. As shown in the diagram, the conventional anti-counterfeiting cap comprises a cap 21 and a perforation 22 disposed at the lower portion of the cap 21. The perforation 22 divides the cap 21 into an upper segment 211 and a lower segment 212. When the cap 21 presses against the coupling portion 111, the perforation 22 connects the upper segment 211 and the lower segment 212 fully. To open the cap 21, the user applies a force to the perforation 22 to separate the upper segment 211 and the lower segment 212, and in consequence the lower segment 212 remains at the opening 11 of the conventional bottle container, so as to effectuate identification and anti-counterfeiting.

As soon as the cap is opened, the seal disposed on the cap gets damaged, and in consequence an antenna structure of the passive RFID tag disposed in the seal gets damaged to thereby prevent unauthorized persons from accessing the data stored in the RFID chip, thereby bringing about an anti-counterfeiting effect.

Taiwan patent M355918 is characterized in that: a RFID chip circuit is disposed in a cap body of a bottle cap; as soon as the bottle cap is opened, the RFID chip circuit disposed in the cap body gets damaged to thereby bring about anti-counterfeiting effect. Taiwan patent M355918 has its advantages, namely adding to the difficulty in forgery, and enhancing the anti-counterfeiting effect. However, the method of manufacturing the anti-counterfeiting structure disclosed in Taiwan patent M355918 is intricate and difficult to implement and promote, thereby adding to the manufacturing costs.

SUMMARY

In view of the aforesaid drawbacks of the prior art, it is an objective of the present invention to provide an anti-counterfeiting tag structure for use with a bottle container, characterized in that the tag structure has a radio-frequency identification (RFID) structure which is difficult to counterfeit, thereby serving an anti-counterfeiting purpose.

Another objective of the present invention is to provide an anti-counterfeiting tag structure, characterized in that the tag structure has a radio-frequency identification (RFID) module for storing data related to goods identified by the tag.

Yet another objective of the present invention is to provide an anti-counterfeiting tag structure, characterized in that the tag structure has a radio-frequency identification (RFID) module for detecting for and responding to data related to goods identified by the tag.

In order to achieve the above and other objectives, the present invention provides an anti-counterfeiting RFID tag structure which is annular and applicable to a bottle container with an opening and a cap. The anti-counterfeiting RFID tag structure comprises: a body being an O-ring; and a RFID device disposed on the body and including a RFID chip circuit and an antenna structure, wherein the anti-counterfeiting RFID tag structure is disposed fully between the cap and the opening of the bottle container whenever the bottle container is sealed, wherein a user reads anti-counterfeiting ID code and product curriculum vitae data stored in the RFID device, using a stationary or handheld RFID reader, to effectuate identification and anti-counterfeiting.

BRIEF DESCRIPTION

Objectives, features, and advantages of the present invention are hereunder illustrated with specific embodiments in conjunction with the accompanying drawings, in which.

DETAILED DESCRIPTION

Figure 1:
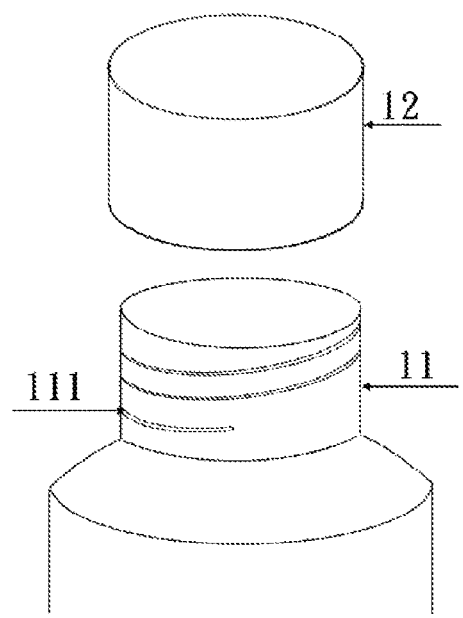
FIG. 1 (PRIOR ART) is a schematic view of a conventional bottle container.
Figure 2:
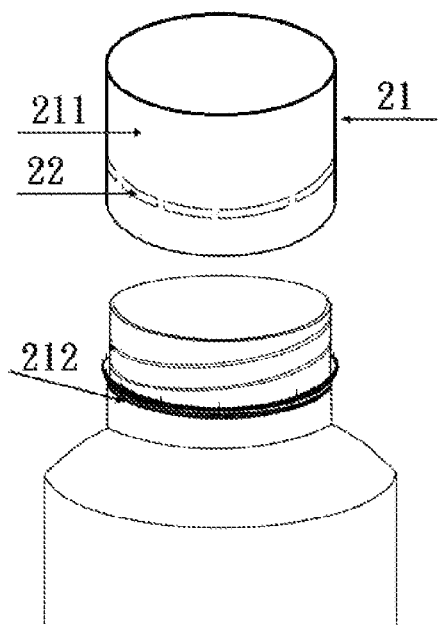
FIG. 2 (PRIOR ART) is a schematic view of a conventional anti-counterfeiting cap.
Figure 3:
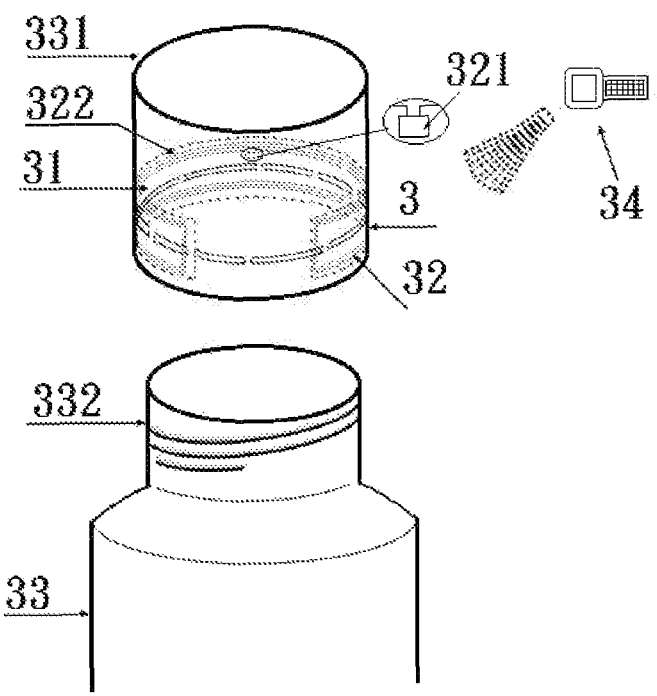
FIG. 3 is a schematic view of an anti-counterfeiting radio-frequency identification (RFID) tag structure according to the first embodiment of the present invention.

Referring to FIG. 3, there is shown a schematic view of an anti-counterfeiting radio-frequency identification (RFID) tag structure 3 according to the first embodiment of the present invention. As shown in the diagram, the anti-counterfeiting RFID tag structure 3 comprises a body 31 and a radio-frequency identification (RFID) device 32 disposed on the body 31. The body 31 is an O-ring made of a non-metallic material, such as a polyethylene (PE) and a foamed material. The RFID device 32 further comprises a radio-frequency identification (RFID) chip circuit 321 and an antenna structure 322. Since the body 31 is made of a non-metallic material, it is practicable that, in a mouth sealing process of a bottle container 33, the anti-counterfeiting RFID tag structure 3 is disposed between a cap 331 and an opening 332 of the bottle container 33. The user reads anti-counterfeiting ID code and product curriculum vitae data stored in the RFID device 32, using a stationary or handheld radio-frequency identification (RFID) reader 34, so as to effectuate identification and anti-counterfeiting.

Figure 4:
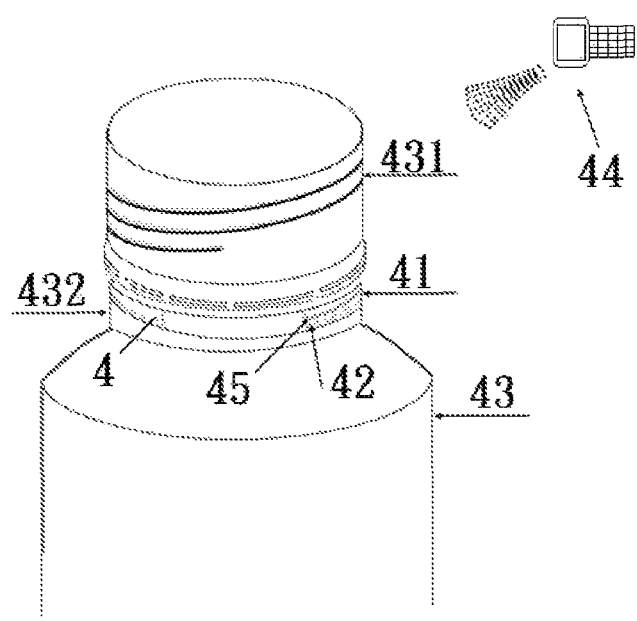
FIG. 4 is a schematic view of an anti-counterfeiting RFID tag structure according to the second embodiment of the present invention.

Referring to FIG. 4, there is shown a schematic view of an anti-counterfeiting RFID tag structure 4 according to the second embodiment of the present invention. As shown in the diagram, the anti-counterfeiting RFID tag structure 4 comprises a body 41 and a radio-frequency identification (RFID) device 42 disposed on the body 41. At the end of a mouth sealing process of a bottle container 43, the anti-counterfeiting RFID tag structure 4 is, partially and revealingly, disposed between a cap 431 and an opening 432 of the bottle container 43. The user reads anti-counterfeiting ID code and product curriculum vitae data stored in the RFID device 42, using a stationary or handheld radio-frequency identification (RFID) reader 44, so as to improve the reading of anti-counterfeiting ID code and product curriculum vitae data. A laser label 45 is adhered to the surface of the anti-counterfeiting RFID tag structure 4, so as to improve identification and anti-counterfeiting. The RFID device 42 is electrically connected to a sensing unit for sensing temperature, humidity, and concentration.

Figure 5:
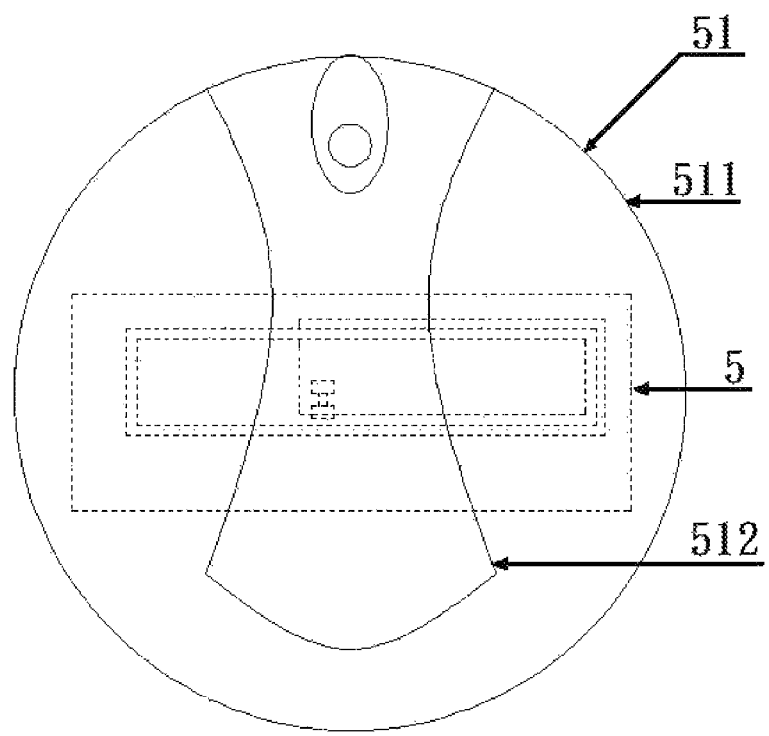
FIG. 5 is a schematic view of an anti-counterfeiting RFID tag structure according to the third embodiment of the present invention.

Referring to FIG. 5, there is shown a schematic view of an anti-counterfeiting RFID tag structure 5 according to the third embodiment of the present invention. As shown in the diagram, the anti-counterfeiting RFID tag structure 5 is disposed in a cap 51. A user removes the cap 51 by pulling the cap 51. The cap 51 comprises a package body 511 and an engagement portion 512. The user pulls the engagement portion 512 and the package body 511 apart. The anti-counterfeiting RFID tag structure 5 is disposed on the package body 511. As soon as the engagement portion 512 is opened, the anti-counterfeiting RFID tag structure 5 gets damaged to thereby bring about an anti-counterfeiting effect.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. An anti-counterfeiting radio frequency identification (RFID) tag structure, being annular and applicable to a bottle container with an opening and a cap, comprising:
   a body being an O-ring; and
   a radio frequency identification (RFID) device disposed on the body and including a radio frequency identification (RFID) chip circuit and an antenna structure, the antenna structure being annularly disposed on the O-ring, wherein a portion of the anti-counterfeiting radio frequency identification (RFID) tag structure is disposed between an inner side of the cap and the opening to allow the radio frequency identification (RFID) device to be laterally and annularly disposed at a periphery of the opening, while another portion of the anti-counterfeiting radio frequency identification (RFID) tag structure is exposed from the cap and the opening to thereby allow a laser label to be adhered to a surface of the exposed portion of the anti-counterfeiting radio frequency identification (RFID) tag structure, whenever the bottle container is sealed,
   wherein a user reads anti-counterfeiting ID code and product-related manufacturing data stored in the radio frequency identification (RFID) device, using a stationary or handheld RFID reader, to effectuate identification and anti-counterfeiting;
   wherein the anti-counterfeiting radio frequency identification (RFID) tag structure disposed between the inner side of the cap and the opening gets damaged and thus cannot read data as soon as the user rotates the cap to exert a force upon the cap's break point for dividing the cap into an upper cap and a lower cap.

2. The anti-counterfeiting radio frequency identification (RFID) tag structure of claim 1, wherein the body is made of a non-metallic material selected from one of a polyethylene (PE) and a foamed material.

3. The anti-counterfeiting radio frequency identification (RFID) tag structure of claim 1, wherein the radio frequency identification (RFID) device is electrically connected to a sensing unit for sensing temperature, humidity, and concentration of a specified substance of contents of the bottle container.

* * * * *